Dec. 2, 1969  L. M. GREENSTEIN  3,481,663
IRIDESCENT ARTICLES AND METHODS OF MANUFACTURE
Filed Feb. 3, 1965  3 Sheets-Sheet 1
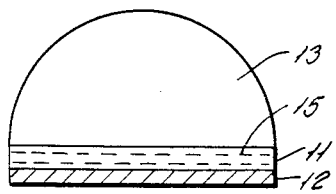
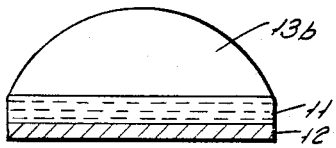
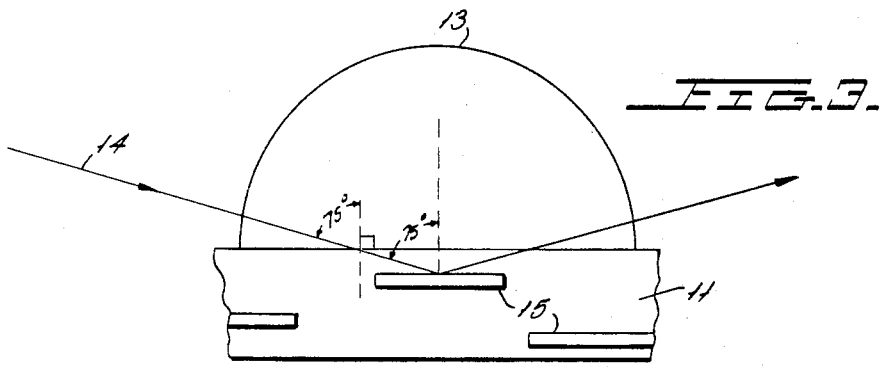
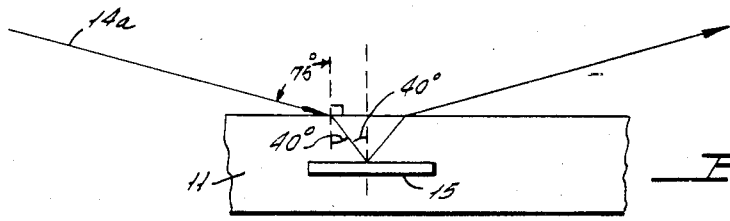
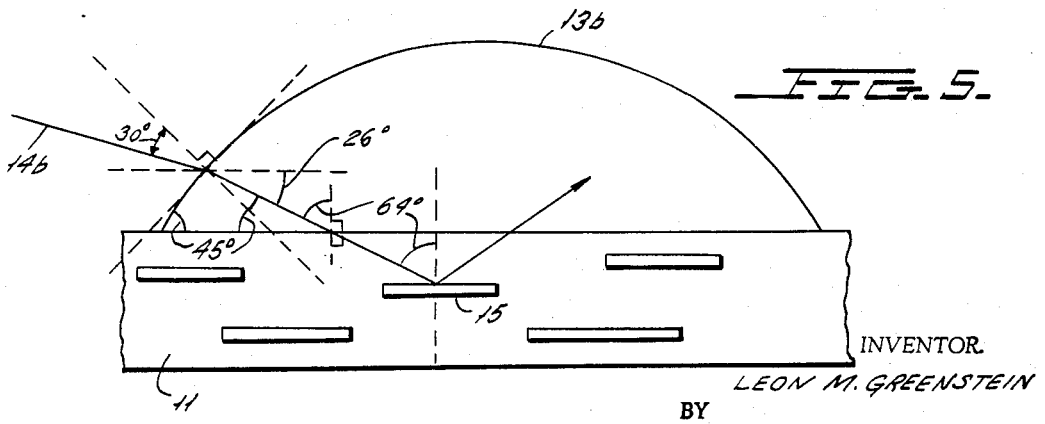
INVENTOR.
LEON M. GREENSTEIN
BY
OSTROLENK, FABER, GERB & SOFFEN
ATTORNEYS

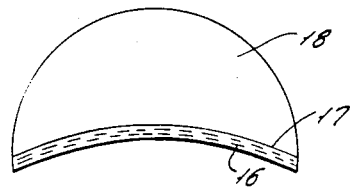
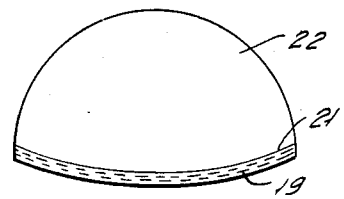
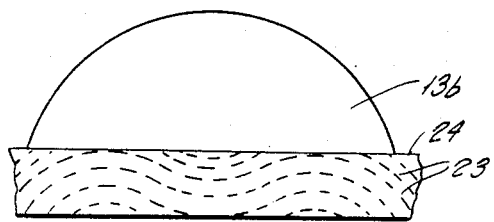
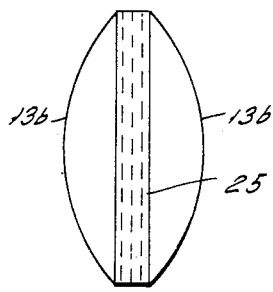
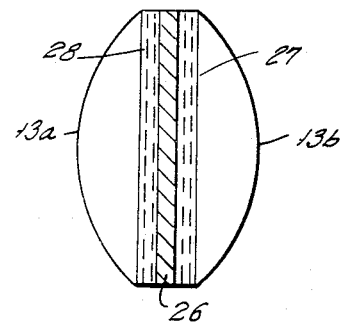
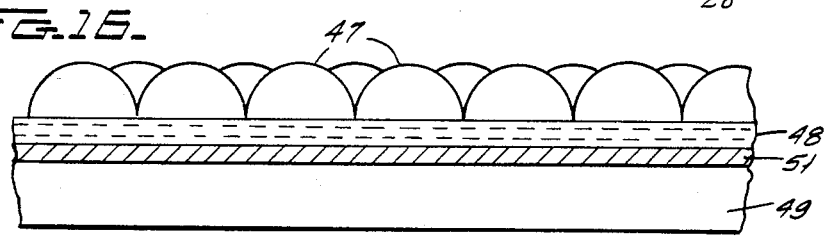
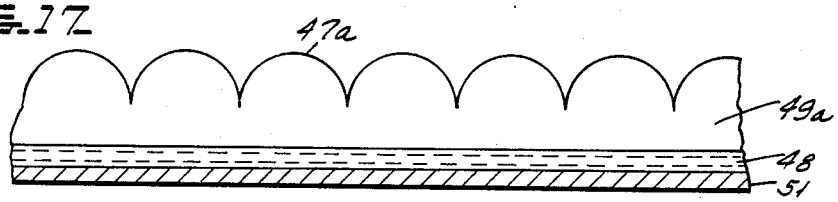
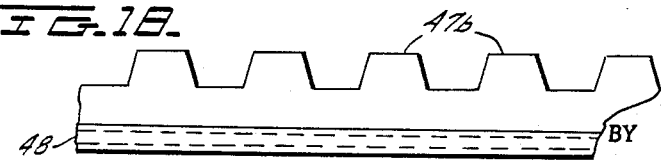
INVENTOR.
LEON M. GREENSTEIN
BY
OSTROLENK, FABER, GERB & SOFFEN
ATTORNEYS Dec. 2, 1969  L. M. GREENSTEIN  3,481,663
IRIDESCENT ARTICLES AND METHODS OF MANUFACTURE
Filed Feb. 3, 1965  3 Sheets-Sheet 3

INVENTOR.
LEON M. GREENSTEIN
BY
OSTROLENK, FABER, GERB & SOFFEN
ATTORNEYS

United States Patent Office 3,481,663
Patented Dec. 2, 1969

3,481,663
IRIDESCENT ARTICLES AND METHODS OF MANUFACTURE
Leon M. Greenstein, Brooklyn, N.Y., assignor to The Mearl Corporation, Ossining, N.Y., a corporation of New Jersey
Filed Feb. 8, 1965, Ser. No. 431,002
Int. Cl. G02b 27/00
U.S. Cl. 350—163   8 Claims

ABSTRACT OF THE DISCLOSURE

There is provided a novel class of iridescent articles incorporating films containing colorless light transmitting platelets of interference thickness which produce different colors by optical interference phenomena upon reflection and transmission of light by such platelets. The intensity and color range of these novel iridescent articles is greater than heretofore obtained. This increase of effect is caused by disposing upon the surface of the platelet-containing film one or a plurality of substantially spherical elements which direct the impinging light in a manner calculated to increase the color range of the iridescent effect.

---

This invention relates to articles displaying iridescent effects and to a method of manufacturing such articles. More particularly, the invention relates to iridescent articles incorporating films containing colorless, light-transmitting platelets of interference thickness which produce different colors by optical interference phenomena upon reflection and transmission of light by such platelets.

In the following specification all parts and percentages are given by weight unless otherwise indicated.

Articles exhibiting iridescent effects upon variation of the angle of observation thereof are known. Such articles have heretofore been formed, for example, by the deposition of interference films produced by chemical reaction producing, for example, lead sulfide or other relatively dark color materials, or by thermal evaporation of high refractive index materials. The chemical procedures must, however, be rigidly controlled with respect to reaction rate and time in an effort to produce uniformly thick films displaying the same play of colors throughout; frequently, the colors thus produced are not in fact reproducible, particularly in large scale commercial operations. Evaporative techniques cannot readily be employed for the deposition of interference thickness films on articles of relatively small size, or having irregular configurations, and have not, therefore, found wide commercial application.

Another technique which has been proposed for the manufacture of iridescent articles involves superposing a polarizing layer with a birefringent layer, the optic axis or axes of which are oriented at diverse angles with respect to one another. Uniform colors are not, however, generally displayed by such an article in view of the difficulty in maintaining constant birefringence and/or thickness in the birefringent layer. Moreover, such articles do not provide bright, clean colors in view of the inherent greenish or grayish colors of the polarizing layers utilized therein.

Recently, in Miller et al. U.S. Patent No. 3,123,485, granted on Mar. 3, 1964, and owned by the assignee of the present invention, colored optical elements have been described, which comprise light-transmitting supporting media having, as color—and nacre-producing substances therein, colorless platelets of interference film thicknesses such that colors are produced by optical interference phenomena upon reflection and transmission of light thereby. In use, such platelets are incorporated in plastic coatings or cast articles. When the platelets are oriented in a given plane, they reflect a color which depends on their thickness and refractive index, on the angle of observation thereof, and on the refractive index of the medium in which they are incorporated. Such color appears continuous, since the platelets are usually of microscopic dimensions and are not individually discernible by the eye.

When such colorless pigment platelets are examined by transmitted light, the transmission color thereof is seen to be the complement of the reflection color. The reflection maximum, $\lambda_{\text{max.}}$, and the reflection minimum, $\lambda_{\text{min.}}$, may be determined from the following relationships:

$$\lambda_{\text{max.}} = \frac{4t\sqrt{N_2^2 - N_1^2 \sin\theta}}{2n - 1} \quad (1)$$

$$\lambda_{\text{min.}} = \frac{2t\sqrt{N_2^2 - N_1^2 \sin\theta}}{n - 1} \quad (2)$$

wherein $t$ is the thickness of the platelets employed; $N_2$, the refractive index of the platelet material; $N_1$, the refractive index of the medium in which the platelets are incorporated; $n$, a small integer, i.e., 1, 2, 3, etc.; and $\theta$ the angle of incidence, i.e., the angle between the light rays incident on the platelets and a normal to the platelet face.

When the platelets are observed by light incident perpendicularly thereon ($\theta = 0°$), the quantity under the radical sign in each of Equations 1 and 2 reduces to $N_2$. An increase in the angle of incidence decreases the values under the radicals, thus shifting $\lambda_{\text{max.}}$ and $\lambda_{\text{min.}}$ to smaller values. Hence, when an interference thickness film containing such platelets is viewed from various angles of incidence, the color observed will shift, producing a play of colors, or iridescence.

Extremely thin pigment platelets do not produce interference colors. The first pronounced transmission color (which corresponds to a reflection minimum for that color) which appears with increasing platelet thickness is blue. Considering the case of light perpendicularly incident upon such a platelet, the condition for the first reflection minimum may be seen, from Equation 2, to occur when $$400 = \frac{2tN_2}{2 - 1}$$

In such case, $n$ has been taken as 2 and the reflection minimum as the 400 millimicron (m$\mu$) wavelength marking the lower end of the visible spectrum. The multiplication product of the platelet thickness in millimicrons and and index of refraction thereof ($N_2t$), which may also be characterized as the "optical thickness" of the platelets, is thus 200 m$\mu$.

Hence, when the optical thickness of a colorless platelet of the type disclosed in the Miller et al. patent is 200 m$\mu$, blue light is transmitted therethrough and the complementary color, i.e., all wavelengths other than blue, viz., yellow or gold, is reflected from the platelets. Thicker platelets reflect, in turn, red or magenta, purple, blue and finally green. An additional increase in thickness again produces a yellow reflection color which, for convenience, is here referred to as second yellow. Still thicker platelets exhibit second red, second blue, second green, third yellow, third red, etc.

The optical thicknesses of some of the more intense reflection colors are shown in Table I. The cyclical nature of the color changes is described by Equations 1 and 2 above, as larger integers are used for $n$.

TABLE I.—OPTICAL THICKNESS ($N_2t$) OF REFLECTION COLORS

| Reflection color at perpendicular incidence: | Approx. optical thickness (m$\mu$) |
| --- | --- |
| First yellow | 190 |
| First red | 255 |
| First purple | 280 |
| First blue | 310 |
| First green | 350 |
| Second yellow | 405 |
| Second red | 500 |
| Second purple | 560 |
| Second blue | 625 |
| Second green | 700 |
| Third yellow | 740 |
| Third red | 780 |
| Third blue | 900 |
| Fourth purple | 1100 |
| Fourth green | 1220 |
| Fifth yellow | 1280 |
| Fifth red | 1340 |
| Fifth green | 1480 |

As noted hereinabove, when interference colored pigment platelets are observed by light not perpendicularly incident thereon, the colors observed shift from the colors indicated in Table I. Hence, when the angle of incidence is increased, first yellow fades to colorless, first red turns to yellow, first blue to purple, and first green to blue. The second colors shift through still greater color ranges, second yellow becoming green and then blue green, second red shifting to green, second blue to red, and second green to purple. The third, fourth and particularly fifth colors similarly demonstrate larger shifts than first colors when viewed at varying angles of incidence.

It is among the objects of the present invention to increase the color shifts displayed by interference colored pigment platelets such as described above, and thereby provide articles of manufacture exhibiting marked plays of color and resulting iridescence.

A further object of the invention is to provide such articles having precisely reproducible color characteristics without, however, necessitating great precision in the manufacturing technique.

A still further object of the invention is to provide a method for producing such articles which may be readily and economically practiced in large scale commercial operations.

Other objects and advantages of the present invention will be apparent from the following detailed description of preferred embodiments thereof, taken in connection with the accompanying drawings in which:

FIGURE 1 is a schematic section through an iridescent article embodying the present invention;

FIGURE 2 is a schematic view, similar to FIGURE 1, of a further embodiment of the iridescent article hereof;

FIGURES 3 and 4 are schematic sections illustrating the paths of light rays incident at the same angle on iridescent articles, the first of which (FIGURE 3) incorporates a structure, namely that of FIGURE 1, in accordance with the present invention;

FIGURE 5 is a schematic view of the same type as FIGURE 3, illustrating the path of a light ray approaching from the same direction as that of FIGURE 3 but encountering the structure of FIGURE 2 rather than the structure of FIGURE 1;

FIGURES 6, 7 and 8 are schematic sections through additional forms of the iridescent article hereof;

Figure 14:
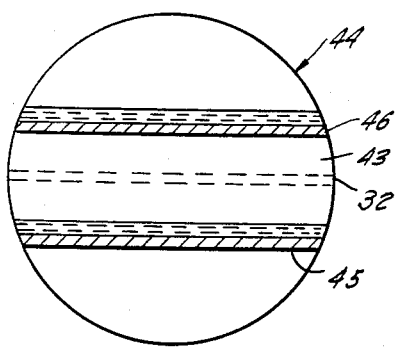
Figure 15:
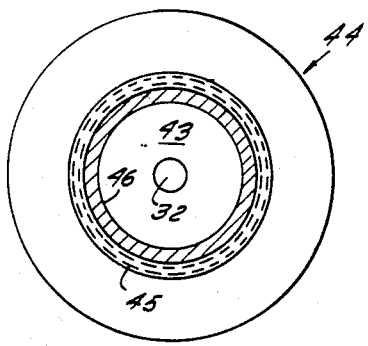

FIGURES 9 to 14, inclusive, are schematic sections through still further embodiments in which the iridescent articles shown may be utilized to simulate natural gem stones;

FIGURE 15 is a schematic section through the embodiment illustrated in FIGURE 14, viewed in a direction at right angles to FIGURE 14; and FIGURES 16, 17 and 18 are schematic sections through sheet material elements incorporating three further forms of the invention.

The iridescent article of manufacture of the present invention comprises a light-transmitting supporting layer containing colorless, light-transmitting pigment platelets, bonded to a light-transmitting optically refracting element through which such platelets are visible. The pigment platelets have substantially uniform thicknesses and an index of refraction of at least 1.70, the multiplication product of the average thickness of such platelets, expressed in millimicrons, and the index of refraction thereof being in the range of from about 300 to 1500 such that the platelets, though colorless, exhibit colors by optical interference phenomena upon reflection and transmission of light therethrough. The optically refracting element bonded to the platelet-containing layer has an index of refraction differing by no more than about 0.15 from the index of refraction of such layer and, in accordance with the invention, has a configuration such that at least ⅓ of the area of the outer surface thereof is angularly disposed at no less than about 25° with respect to the superposed area of the platelet-containing layer.

It has been found that iridescent articles possessing the structure thus defined exhibit markedly greater color shifts with variation in angle of observation than are displayed by the corresponding platelet-containing layers themselves. Such articles thus produce superior color plays and consequent iridescence.

The increased color shifts exhibited by iridescent articles constructed in accordance with the present invention may be illustrated in connection with FIGURE 1 of the drawings. In this figure a composite article is illustrated, comprising a light-transmitting film 11 containing interference-colored pigment platelets (see 15 in FIGURE 3). The film or layer 11 is mounted on layer 12 containing an opaque pigment, usually black or white, and in turn supports a transparent hemispherically shaped optically refracting element 13, through which the platelets are viewed. The effect of the hemispherical element 13, as noted above, is to increase the extent of the color shift observed when viewing the article at incident angles other than normal to the platelet surfaces. Table II summarizes the color shifts observed when iridescent articles incorporating pigment platelets exhibiting second colors were viewed at angles varying from perpendicular incidence to grazing angles employing, on the one hand, the configuration shown in FIGURE 1, and, on the other hand, a like article which did not incorporate a refracting element 13.

TABLE II.—INCREASED COLOR SHIFTS OF IRIDESCENT ARTICLES OF THE INVENTION

| Color at Perpendicular Incidence | Color Shift on Tilting Toward Grazing Angle | |
| --- | --- | --- |
| | Figure 1 | Article Without Element 13 |
| Yellow | Green to blue to purple to red | Green to blue. |
| Red | Yellow to green to blue to purple | Yellow to green. |
| Blue | Purple to red to yellow to green | Purple to red. |
| Green | Blue to purple to red to yellow | Blue to purple. |

While, as will be noted from Table II, a considerable shift of colors is obtained when the interference-colored pigment layer is viewed directly at varying angles, observation through the optically refracting element 13 extends the color shift so that all the colors in the spectrum come into view as the object is tilted.

The increased color shifts produced by the iridescent article hereof may, it is believed, be explained in terms of the ray diagrams illustrated in FIGURES 3, 4 and 5. FIGURE 3 shows a ray of light 14 incident upon a pigment platelet 15 disposed within a light transmitting supporting layer 11 therefor. As in the embodiment of FIGURE 1, the layer 11 is integral with a superposed, hemispherically shaped refracting element 13, which has substantially the same index of refraction as the constituent material of layer 11. The light ray 14 is not bent upon entering element 13, since it is perpendicularly incident thereon. Moreover, since the refractive index of layer 11 is substantially the same as that of element 13, the ray is incident on platelet 15 without further deflection, in this case at an angle of about 75°.

In contrast thereto, when the light ray 14a is directly incident upon the surface of the light transmitting layer 11 (FIGURE 4) it is refracted toward the normal to such surface. If the light ray is originally travelling in air and the film 11 is comprised of nitrocellulose, having an index of refraction of 1.5, the angle of refraction determined by Snell's Law is about 40°. The refracted ray is thus incident upon platelet 15 within the layer 11 in FIGURE 4 at an angle of incidence of 40°, some 35° less than the angle of incidence of the same ray on the iridescent article shown in FIGURE 3.

Even where a light ray is incident on a refracting element defining a substantially lesser angle with respect to the interference-colored platelets, markedly greater angles of incidence can nevertheless be obtained than are achieved in the absence of such an element.

In FIGURE 5, the optically refracting element 13b makes a smaller maximum angle with respect to light-transmitting layer 11 than does hemisphere 13 in FIGURE 3. In this case, light ray 14b, which makes the same angle with the light-transmitting layer as ray 14 in FIGURE 3, strikes the optically refracting element at an angle of incidence of 30° instead of 0°, as in FIGURE 3. Nevertheless, there is sufficient refraction for the light to be incident on platelet 15 of FIGURE 5 at an angle as large as 64°. Thus, although the angle of incidence of ray 14b upon platelet 15 is decreased somewhat from the high angle of incidence of 75° (FIGURE 3), such angle is much greater than the 40° at which the ray 14a strikes platelet 15 in FIGURE 4, in the absence of an optically refracting element.

As indicated above, the wave lengths of the reflection maxima and minima depend on the angle of incidence upon the platelet exhibiting interference effects, the greater the angle of incidence, the greater the color shift from the color displayed by light incident perpendicularly on the platelet in question. Hence, use of the refracting elements 13 or 13b, for example, decreases the amount of refraction prior to incidence upon the interference-colored platelets, thus providing a greater range of angles of incidence on such platelets and, consequently, greater plays of color and iridescence on viewing the composite article.

It will be appreciated that, while the preceding geometrical analysis is believed to explain the increased color shifts exhibited by iridescent articles provided in accordance herewith, the present invention should not be restricted thereto.

The interference-colored platelets utilized in accordance with the present invention may comprise any suitable substantially colorless plate-like pigments such as basic lead carbonate, titanium dioxide-coated mica or other platelet forming materials such as disclosed, for example, in the aforesaid U.S. Patent No. 3,123,485, as well as in other U.S. patents and pending applications owned by the assignee of the present invention.

The color-producing platelets suitable for use in the present invention have minimum optical thicknesses capable of exhibiting a first blue reflection color, i.e., about 310 m$\mu$., and maximum thicknesses capable of producing a fifth green reflection color, i.e., about 1480 m$\mu$. Preferably, however, platelets having optical thicknesses varying from about 350 to 900 m$\mu$. are utilized; such platelets correspond to first green and second and third reflection colors which, when utilized in iridescent articles in accordance with the invention, display color shifts, with approximately 85° variations in angle of incidence, of substantially the entire spectrum, e.g., green to yellow, or blue to green, encompassing all the colors in between. While fifth colors, for example, display color shifts of two whole spectra, e.g., red to red and on to the next purple, the colors thus viewed are less intense than the second and third colors, detracting somewhat from the spectacular nature of the desired color play.

The supporting medium for the interference-colored platelets is conveniently constituted of a light-transmitting high polymer or resin such, for example, as nitrocellulose, methyl cellulose, ethyl cellulose, cellulose acetate, a polyester resin, polyvinyl chloride, polyvinyl acetate, polyvinyl butyral, polyvinyl alcohol, an acrylic resin, a polyurethane resin, an epoxy resin, polystyrene, or gelatin.

The optically refracting element may be constituted of a light-transmitting polymerized resin or other transparent medium which may be of the same material as the platelet-supporting medium such, for example, as ethyl cellulose, cellulose acetate, a polyester resin, polyvinyl chloride, polyvinyl acetate, polyvinyl butyral, an acrylic resin, an epoxy resin, polystyrene, polyethylene, a urea-formaldehyde resin, a phenol-formaldehyde resin, a polycarbonate resin, or glass.

Preferably, the refracting element is constituted of the same material as the supporting medium for the color-producing platelets. In such instance, as illustrated in FIGURES 3 and 5, for example, there is no refraction at the interface between the optically refracting element and the platelet-containing supporting layer. If the refracting element has a slightly lower refractive index than the platelet-containing medium, there is some refraction at the interface between the two, the angle of incidence on the platelet particles being slightly reduced. If, on the other hand, the refracting element has a refractive index slightly higher than the platelet-containing medium, the angle of incidence on the platelet is actually increased somewhat. In such case, however, internal reflection occurs at the interface for those large angles of incidence which exceed the critical angle ($\sin^{-1} N_b/N_a$ wherein $N_a$ is the refractive index of the refracting element and $N_b$ the refractive index of the platelet-containing medium). If internal reflection occurs, light is totally reflected from the interface between the refracting element and the platelet-containing medium, and cannot encounter the color-producing platelets.

The two indexes of refraction should, therefore, be close to one another. Although very dramatic color shifts may be observed when the optically refracting element and the platelet-containing medium have indexes of refraction which differ by no more than about 0.15 from one another, it is preferred that the constituent materials have refractive indexes which are within 0.10 of each other. It is further desirable, although not essential, that the refractive index of the refracting element be equal to or lower than that of the platelet-containing medium, in order to eliminate the possibility of internal reflection.

The material of which the refracting element is composed need only be light-transmissive, i.e., such element may either be transparent or translucent. When a transparent element is utilized, the composite iridescent article is a gem-like object exhibiting intense colors. A slight translucence may actually be desirable in some instances, as when it is desired to soften the quality of the colored reflections, introducing a more subdued color play suggestive of natural gems like opals. In such case the optically refracting element may be rendered translucent by incorporating, in the constituent material thereof, a low concentration of light-scattering particles, e.g., $SiO_2$, $BaSO_4$, $CaCO_3$, $CaSO_4$, etc.

The optically refracting element is ordinarily colorless, in order to give full play to the iridescent colors. However, it may be colored to modify the iridescence observed, by incorporating conventional dyes or pigments therein. Such conventional colorants should, however, be used at low concentrations in order to modify the iridescent colors without completely masking the same.

As shown in FIGURES 1 and 2 referred to above, it is preferred to provide an opaque backing layer 12 behind the platelet-containing layer 11 of the iridescent articles hereof. When a black pigment is employed in layer 12 only reflection colors are visible through the optically refracting element 13. If a white pigment is instead incorporated in layer 12, both reflection and transmission colors may be thus observed, further increasing the color play. If, for example, the structures of FIGURES 1 or 2 are observed by means of a single light source, the reflection color will be perceived where the angle of reflection equals the angle of incidence. At other angles, the structure will display transmission colors which are the complements of the reflection colors, since light will penetrate through the layer of color-producing platelets to the white substrate below. Reflections from this diffusing white layer are again transmitted through the color-producing platelets, reaching the eye as transmission colors. Under these conditions, the reflection colors appear somewhat less intense, because they are diluted by transmitted light, but the total play of color is increased.

Alternatively, the opaque backing layer 12 need not be employed in the iridescent articles of the present invention. In such instance, the iridescent article will display reflection colors, or a combination of reflection and transmission colors, depending upon whether it is viewed against a dark or a light background.

Irrespective of the specific composition of the refracting element, or the presence or absence of an underlying backing layer, it is important that at least ⅓ of the area of the outer surface of the refracting element be disposed at an angle or angles of no less than 25° with respect to the superposed area of the platelet-containing medium. The desired color shift is, in fact, enhanced by the use of constructions defining greater angles, it being preferred that at least about ⅓ of the surface area of the optically refracting element define an angle of at least about 40° with respect to the plane of the color-producing platelets. Employing a hemispherically shaped refracting element 13 and a planar platelet containing supporting medium 11, such as disclosed in FIGURE 1, approximately 90% of the surface area of the refracting element defines an angle of 25° or more with respect to the plane of the platelets, and about 77% of the surface of such element defines an angle of 40° or greater.

The iridescent articles of the invention are produced by suitably dispersing the pigment platelets in the supporting medium therefor, forming a layer containing the oriented platelets, and bonding such layer to the desired refracting element. It will be appreciated that the platelet-supporting medium may be chosen after initially determining the index of refraction of the refracting element, or vice versa, as desired. When the platelet-containing medium is a film which may be applied as a liquid, e.g., from a lacquer solution, it may be deposited directly on a surface of the optically refracting element. When, on the other hand, the platelet-containing medium is a preformed sheet or the like, it may be bonded to the optically refracting element by heat or pressure or through the agency of a light-transmitting adhesive.

Adhesive materials utilized to bond the platelet-containing layer to the refracting element should have refractive indexes which, preferably, are not less than the smaller of the refractive indexes of the optically refracting element and the platelet-containing medium. Use of an adhesive having a lower refractive index would introduce additional possibilities for internal reflection. By utilizing an adhesive having a refractive index higher than the indexes of either the optically refracting element or the platelet-containing medium, no effect is produced on the critical angle, so long as the adhesive layer is substantially planar with its two surfaces parallel to one another. However, in order to minimize non-color-producing reflections, the adhesive layer should not have a refractive index appreciably larger than either such refractive index. It is, therefore, preferred that the adhesive layer, when employed, have a refractive index which is not more than about 0.10 greater than the larger of the refractive indexes of the refracting element and the platelet-containing medium.

The configuration of the iridescent article of the present invention is subject to wide modification. For example, the refracting element thereof may be in the form of the hemispherically shaped element 13 of FIGURE 1, or in the configuration of the spherical segment as in element 13b of FIGURE 2. Alternatively, the refracting element may take other forms, e.g., half of a prolate or oblate spheroid. While the optically refracting element 13b is relatively flat in comparison with element 13, it nevertheless produces a color shift approaching that effected by use of element 13 and the composite article incorporating the same, like that of FIGURE 1, possesses a luminous, iridescent quality.

Moreover, the platelet-containing layer need not, like layer 11 in FIGURES 1 and 2, be disposed in a single plane. Hence, as illustrated in FIGURE 6, a platelet-containing layer 16 may be superposed with a curved surface 17 of an optically refracting element 18, which surface is concave with respect to the refracting element. Similarly, as shown in FIGURE 7, a platelet-containing layer 19 may be superposed with a curved surface 21 of an optically refracting element 22, the surface 21 defining a convex interface with the platelet-containing layer. It will, however, be understood that in each of the articles, FIGURES 6 and 7, a minimum of about ⅓ of the area of the surfaces 17 and 21, along which the color-producing platelets are oriented, is disposed at an angle of more than about 25° with respect to the outer surfaces of the refracting elements 18 and 22, respectively.

A further form of the invention is illustrated in FIGURE 8, in which color producing platelets 23 are oriented in an undulating pattern within a planar support layer 24 therefor. Such patterns may, if desired, be produced by casting the platelets in polymerizable resins by subjecting the resinous material, during casting, to orienting forces in a manner well known in the art. Color changes are thus seen with changing orientation of the platelets, as well as with changes in the directions of illumination of the composite iridescent article.

In a further embodiment of the invention, shown in FIGURE 9, two iridescent articles similar to that illustrated in FIGURE 2 are superposed to provide a pendant. In this particular embodiment, however, no backing layers are provided adjacent the platelet-containing strata, the single composite platelet-containing layer 25 causing the pendant to display variable reflection colors depending on the angle of observation thereof. It will be noted that transmission colors may or may not be observed in connection with such article, depending upon whether the pendant is viewed against a dark or a light background.

If desired, the appearance of the pendant can be fixed by incorporating an opaque pigmented layer at the center of the pendant, as illustrated in FIGURE 10. In this embodiment, a pair of the articles illustrated in FIGURE 2 are superposed, defining an article including a composite opaque central layer 26, and color-producing platelet-containing layers 27 and 28 oriented parallel to a plane bisecting the resulting article. As noted above, a combination of transmission and reflection colors, or reflection colors alone, may be thus produced, depending upon whether a white or black pigment is contained in layer 26. Alternatively, the composite central layer may contain other colorants tending to modify the overall colors of the article obtained by means of the thin film interference effect.

Figure 11:
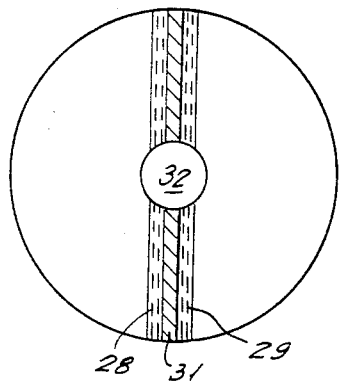

Iridescent spherical beads may also be provided in accordance with the invention. FIGURE 11 illustrates a bead made by combining two hemispheres similar to that shown in FIGURE 1. The composite article includes a pair of platelet-containing layers 28 and 29 separated by a composite opaque backing layer 31. The bead may also be provided with a diametrically extending channel 32 to facilitate stringing thereof. The structure of FIGURE 11 provides colors in all positions except when viewed along the planes of the color-producing platelets, in which positions the object appears to be a colorless sphere.

Figure 12:
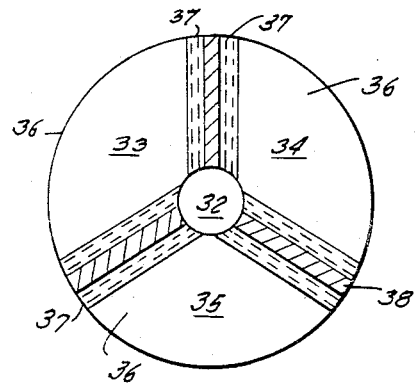

A spherical article exhibiting iridescence at all angles of observation is shown in FIGURE 12; such article comprises a composite of three spherical members rather than two hemispheres. The composite article comprises members 33, 34 and 35, each of which is a third of a sphere and each of which comprises conically-shaped refracting elements 36 and platelet-containing layers 37. The members, when bonded together, define a composite backing layer 38, constituted of the superposed strata of the conical backing layers of the individual members. Unlike the structures described above, the color-shifts displayed by the article of FIGURE 12 are not completely continuous since sharply different colors may be seen at some angles of observation because of the intersections of the various planes at 120°.

Figure 13:
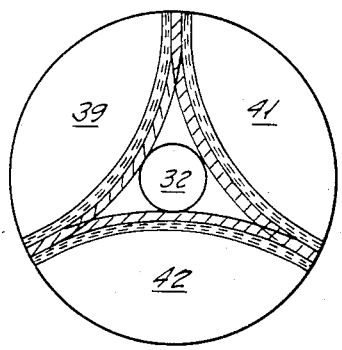

For situations in which sharp color contrasts are not desired, a continuous effect can be insured by connecting the several layers of the individual spherical members along curved surfaces, as shown in the form of the invention of FIGURE 13. In this figure, spherical members 39, 41 and 42 are bonded together, the platelet-containing and backing layers thereof abutting one another along curved surfaces.

A further form of spherical bead exhibiting the iridescent effect of the invention is illustrated in FIGURES 14 and 15. The iridescent article shown comprises a cylindrical core 43 having rounded heads in order that it may fit smoothly into a spherical shape. The optically refracting element is provided in the form of a light-transmitting sphere 44 into which the core 43 is fitted. A platelet-containing layer 45 is provided on the outer surface of core 43, the platelets being oriented parallel to the cylindrical surface of the core. An undercoat or backing layer 46 containing an opaque pigment may additionally be provided, underlying the platelet-containing layer.

The iridescent article of manufacture of the present invention may incorporate a faceted refracting element or, if desired, may take the form of a decorative sheeting, either rigid or flexible in nature. FIGURE 16 represents a plastic sheet material, the surface of which is modified to define a plurality of hemispherical domes 47 providing an array in a desired pattern. The array of refracting elements 47 is disposed adjacent to a supporting layer 48 containing the desired color-producing platelets, oriented parallel to the face of a supporting sheet 49 therefor. A pigmented opaque backing layer 51 may optionally be provided intermediate the supporting sheet and the platelet-containing layer, as described hereinabove.

The array of refracting elements may, if desired, be spaced from the platelet-containing layer 48, as shown in FIGURE 17 in which refracting elements 47a are provided on the side of sheet material 49a remote from layer 48.

The refracting elements 47 and 47a of FIGURES 16 and 17 provide a continuous shift in color within each element when the composite sheet material is observed at changing angles.

If the optically refracting elements are provided with sharp angles, as was the case in FIGURE 12, facets with sharply different colors are produced. Such a structure is illustrated in FIGURE 18, in which the optically refracting array is defined by a plurality of units 47b having frustoconical or frustopyramidal shapes. When observed through the angled sides of the frustoconical or frustopyramidal elements, the iridescent sheet material displays marked shifts in color, thus providing sharply contrasting colors from point to point on the surface thereof.

It will be appreciated that other modifications of the iridescent articles hereof may be made without departing from the scope of the present invention. Hence, the array of refracting elements illustrated in FIGURES 15–18 may, if desired, be provided by depressions formed in the surface of the supporting sheet upon which the platelet-containing layer is supported, rather than by projections formed thereon. In either event, or whatever specific form is utilized for the refracting elements employed, it is intended that at least one-third of the outer surface area of each of the elements of the refracting array defines an angle of more than about 25° with respect to the superposed area of the color-producing platelet-containing layer.

The following examples further illustrate the manufacture of preferred forms of the iridescent article of the present invention:

EXAMPLE I

Second green basic lead carbonate platelets with black undercoat

A nitrocellulose vehicle for applying the interference color-reflecting platelets had the following composition:

Lacquer A:

| | Percent |
|---|---|
| Nitrocellulose, RS type, 30–40 seconds | 12.0 |
| Ethanol | 4.0 |
| n-Butyl acetate | 42.0 |
| Ethyl acetate | 42.0 |
| | 100.0 |

A second lacquer, used for formation of the opaque pigment-containing backing layer, had the following composition:

Lacquer B:

| | Percent |
|---|---|
| Nitrocellulose, RS type, ½ second | 24.0 |
| Ethanol | 8.0 |
| n-Butyl acetate | 34.0 |
| Ethyl acetate | 34.0 |
| | 100.0 |

A green-reflecting lacquer was prepared from basic lead carbonate platelets in Lacquer A. The platelets (a Murano Color of The Mearl Corporation) had a diameter of approximately 20 microns and a thickness of approximately 310 m$\mu$, corresponding to an optical thickness of 650 m$\mu$. The reflection color was second green. The green lacquer consisted of:

| | Percent |
|---|---|
| Basic lead carbonate platelets reflecting second green, 35% suspension in nitrocellulose lacquer | 20.0 |
| Lacquer A | 80.0 |
| | 100.0 |

This lacquer was painted on the plane surface of a clear, colorless polymethyl methacrylate hemisphere 12 mm. in diameter. This green-reflecting coating, when dry, was overcoated with a black lacquer of the composition:

| | Percent |
|---|---|
| Carbon black, 8.5% dispersion in nitrocellulose lacquer | 10.0 |
| Lacquer B | 90.0 |
| | 100.0 |

The hemisphere glowed with green light when seen by light perpendicularly incident on the plane surface. As the hemisphere was tilted to increase the angle of incidence, the glow within the hemisphere became blue, then purple, red, orange, and finally yellow.

EXAMPLE II

Second green basic lead carbonate platelets with white undercoat

The second green-reflecting basic lead carbonate platelet of Example I were made into a more concentrated lacquer suspension, as follows:

| | Percent |
|---|---|
| Basic lead carbonate platelets reflecting second green, 35% suspension in nitrocellulose lacquer | 40.0 |
| Lacquer A | 60.0 |
| | 100.0 | and coated on the plane surface of a polyester spherical segment having a radius of 8 mm. and a height of 6 mm. The green-reflecting coating was overcoated with a white lacquer of the following composition:

| | Percent |
|---|---|
| Rutile titanium dioxide, 60% dispersion in nitrocellulose lacquer | 5.0 |
| Lacquer B | 95.0 |
| | 100.0 |

The segment glowed with green light when seen by the specular reflectance of light perpendicularly incident on the plane surface. Tipping the segment slightly to avoid the direct reflection caused the light to turn red, which is the perpendicular transmission color of green-reflecting platelets; the light was transmitted through the film of platelets from the white undercoat. Further tilting of the segment caused the transmission color to become successively orange, yellow, green, and blue.

EXAMPLE III

Third red basic lead carbonate platelets with black undercoat

The procedure of Example I was followed, except that the basic lead carbonate platelets which were used reflected third red. These platelets had a diameter of about 25 microns and a thickness of about 370 m$\mu$, corresponding to an optical thickness of 775 m$\mu$. The red layer was overcoated with a black lacquer, as in Example I.

Examination of the hemisphere by perpendicular incidence showed the object to glow with a red light. A very small tilt changed the reflection color to yellow-green, and further tilting successively produced blue, purple, and red again.

EXAMPLE IV

Second red TiO$_2$ coated mica platelets with black undercoat

The color-reflecting pigment consisted of mica flakes coated with titanium dioxide films of such thickness that second red was reflected. The mica flakes averaged about 15 microns in their longest dimension. The TiO$_2$ layers had a thickness of about 195 m$\mu$, corresponding to an optical thickness of 490 m$\mu$.

The coating vehicle Lacquer C was a lacquer of a polyvinyl chloride-polyvinyl acetate copolymer of the following composition:

| Lacquer C: | Percent |
|---|---|
| VYNS Resin (Union Carbide) | 13.5 |
| Methyl isobutyl ketone | 48.5 |
| Dioxane | 38.0 |
| | 100.0 |

The red-reflecting lacquer consisted of:

| | |
|---|---|
| TiO$_2$-coated mica flakes | 4 |
| Lacquer C | 96 |
| | 100 | and was coated on the plane surface of a clear polyester object in the shape of half an oblate spheroid. The diameter was 8 mm. and the height 5 mm.

When the mica film was dry, it was overcoated with a black lacquer consisting of

| | Percent |
|---|---|
| Carbon black, 15% dispersion in vinyl lacquer | 5 |
| Lacquer C | 95 |
| | 100 |

Since, as noted hereinabove, various changes may be made in the aforesaid iridescent articles and the method for the manufacture thereof without departing from the scope of the present invention, it is intended that the preceding description and the accompanying drawings be considered illustrative and not in a limiting sense.

What is claimed is:

1. An iridescent article of manufacture comprising a light-transmitting supporting layer having, as a color-producing substance therein, colorless, light-transmitting platelets constituted of a material selected from the group consisting of basic lead carbonate and titanium dioxide-coated mica particles and having substantially uniform thicknesses and an index of refraction of at least 1.70, the multiplication product of the average thickness of said platelets expressed in millimicrons and the index of refraction thereof being in the range of from 300 to 1500; and, superposed and bonded to said layer, a light-transmitting optically refracting element, whose outer surface defines a figure or figures of revolution and at least ⅓ of the area of which surface is angularly disposed at no less than 40° with respect to the superposed area of the supporting layer, and which element has an index of refraction differing by no more than 0.15 from the index of refraction of said layer.

2. The iridescent article defined in claim 1, in which the optically refracting element comprises a single refracting unit superposed with and extending over substantially the entire facing surface of said supporting layer.

3. The iridescent article defined in claim 2, in which the optically refracting element possesses the configuration of a spherical member.

4. The iridescent article defined in claim 1, in which the optically refracting element comprises a plurality of individual refracting units defining an array superposed with and extending over substantially the entire facing surface of said supporting layer, at least ⅓ of the outer surface of each of which units is angularly disposed at more than 40° with respect to the superposed area of the supporting layer.

5. The iridescent article defined in claim 1, in which the supporting layer is constituted of a material selected from the group consisting of nitrocellulose, methyl cellulose, ethyl cellulose, cellulose acetate, polyester resins, polyvinyl chloride, polyvinyl acetate, polyvinyl butyral, polyviny alcohol, acrylic resins, polyurethane resins, epoxy resins, polystyrene and gelatin; and in which the optically refracting element is constituted of a material selected from the group consisting of ethyl cellulose, cellulose acetate, polyester resins, polyvinyl chloride, polyvinyl acetate, polyvinyl butyral, acrylic resins, epoxy resins, polystyrene, polyethylene, urea-formaldehyde resins, phenol-formaldehyde resins, polycarbonate resins and glass.

6. The iridescent article defined in claim 1, having the form of a substantially spherical bead and comprising a pair of generally hemispherical members, each of which is constituted of a substantially planar light-transmitting supporting layer containing said platelets and, integral therewith, a superposed hemispherical light-transmitting optically refracting element.

7. The iridescent article defined in claim 1, having the form of a substantially spherical bead and comprising three segments, each of which defines a third of the sphere and includes a light-transmitting supporting layer containing said platelets and, integral therewith, a superposed light-transmitting optically refracting element.

8. The iridescent article defined in claim 1, having the form of a substantially spherical bead and comprising a central disc-shaped core having a pair of substantially planar, spaced-apart light-transmitting supporting layers containing said platelets, and a pair of spherical segments secured to the opposite sides of said core and integral with the respective supporting layers, defining a pair of said light-transmitting optically refracting elements.

References Cited

UNITED STATES PATENTS

| 2,447,828 | 8/1948 | West. | |
| 2,663,171 | 12/1953 | Boone | 350—158 X |
| 2,700,919 | 2/1955 | Boone | 350—153 X |
| 3,011,383 | 12/1961 | Sylvester et al. | 350—1 |
| 3,071,482 | 1/1963 | Miller | 117—159 X |
| 3,123,485 | 3/1964 | Miller | 106—148 |
| 3,125,484 | 3/1964 | Weiss. | |

DAVID SCHONBERG, Primary Examiner

T. H. KUSMER, Assistant Examiner

U.S. Cl. X.R.

117—159; 161—5, 6, 34; 350—167